United States Patent [19]

Itou et al.

[11] Patent Number: 5,119,257
[45] Date of Patent: Jun. 2, 1992

[54] ROTARY HEAD DEVICE HAVING A MOTOR WITHIN THE ROTARY DRUM, AND MAGNETIC RECORDING AND REPRODUCING APPARATUS USING THE SAME

[75] Inventors: Tetsuo Itou; Hidekazu Takeda; Masao Iwakura; Nobuo Masuoka; Toshio Osada, all of Katsuta, Japan

[73] Assignees: Hitachi, Ltd., Tokyo; Hitachi Video Engineering Inc., Kanagawa, both of Japan

[21] Appl. No.: 470,898

[22] Filed: Jan. 26, 1990

[30] Foreign Application Priority Data

Jan. 30, 1989 [JP] Japan .................. 1-17656

[51] Int. Cl.⁵ .................. G11B 15/60; G11B 5/027
[52] U.S. Cl. .................. 360/130.24; 360/84; 360/130.22; 360/109; 360/87
[58] Field of Search .................. 360/137, 84-87, 360/104-109, 130.22-130.24, 75, 76

[56] References Cited

U.S. PATENT DOCUMENTS

| 4,603,359 | 7/1986 | Narasawa et al. | 360/84 X |
| 4,623,944 | 11/1986 | Yamashita | 360/84 X |
| 4,740,848 | 4/1988 | Schild et al. | 360/84 X |
| 4,891,726 | 1/1990 | Suwa et al. | 360/130.23 X |

FOREIGN PATENT DOCUMENTS

| 55-150125 | 11/1980 | Japan | 360/84 |
| 57-162120 | 10/1982 | Japan | 360/109 |
| 58-98802 | 6/1983 | Japan | 360/84 |
| 63-181151 | 7/1988 | Japan | 360/84 |
| 63-228408 | 9/1988 | Japan | 360/130.24 |
| 1-264625 | 11/1989 | Japan | 360/130.24 |
| 2149955 | 6/1985 | United Kingdom | 360/130.22 |
| 2211343 | 6/1989 | United Kingdom | 360/130.24 |

Primary Examiner—Aristotelis Psitos
Assistant Examiner—Alfonso Garcia
Attorney, Agent, or Firm—Antonelli, Terry, Stout & Kraus

[57] ABSTRACT

A rotary head device having a rotary drum and a rotating motor within the rotary drum, with the stator of the motor being supported by a fixed arm attached to a fixed drum or to a fixed drum supporting member. The construction permits the manufacture of the rotary head device using the manufacturing equipment used for conventional rotary shaft type rotary head devices despite the rotary head device being a thin device. In this rotary head device the position of contact of a ground brush and a rotor can be set at the center of rotation or thereabouts, so despite it being a thin device, the sliding speed of the ground brush is low, and hence it is possible to prevent the abrasion of the ground brush and also to prevent increase of the rotative driving torque.

9 Claims, 2 Drawing Sheets

ROTARY HEAD DEVICE HAVING A MOTOR WITHIN THE ROTARY DRUM, AND MAGNETIC RECORDING AND REPRODUCING APPARATUS USING THE SAME

BACKGROUND OF THE INVENTION

The present invention relates to a structure of a thin, rotary head device for use in a magnetic recording and reproducing apparatus of a high density, e.g. VTR (video tape recorder), and also relates to a magnetic recording and reproducing apparatus using the rotary head device.

For example, a conventional rotary head device is disclosed in Japanese Patent Laid-Open No. 181151/1988, in which the motor of the rotary head device is disposed under a fixed drum. According to the structure disclosed therein, the motor drives the rotary drum through a shaft which is supported rotatably at the center of the fixed drum.

In the rotary head device of such structure, it is difficult to decrease the height of the apparatus because the motor is disposed under the fixed drum.

As a structure for overcoming such drawback there is proposed a structure of a rotary head device in Japanese Patent Laid-Open No. 150125/1980, in which a motor is disposed within a rotary drum to reduce the height of the rotary head device to a great extent. According to this structure, the motor is supported and fixed by a shaft which is fixed at the center of a fixed drum.

However, the above structure of the rotary head device in which the central shaft is fixed is different in machining and assembling method from a rotary shaft type structure which has widely been adopted so far, and therefore the conventional manufacturing equipment for rotary shaft type rotary head devices cannot be used.

Besides, it is necessary that the potential level of the rotary drum be grounded in order to suppress the noise contained in a playback signal provided from the head. In conventional rotary shaft type rotary head devices, an earth brush, is brought into contact with the center of the rotary shaft to ground the rotary drum. On the other hand, in a fixed shaft type rotary head device in which a shaft is fixed to a fixed drum, the position for contact of an earth brush is only outside the outside diameter of the fixed shaft. In the fixed shaft type, therefore, the sliding speed at the earth brush contact portion is high, thus causing problems such as abrasion of the earth brush and increase of the driving torque.

SUMMARY OF THE INVENTION

It is an object of the present invention to overcome the above-mentioned drawbacks of the prior art and to provide a thin rotary head device capable of being produced using the conventional manufacturing equipment for rotary shaft type rotary head devices, as well as a magnetic recording and reproducing apparatus using the same.

It is another object of the present invention to provide a thin, rotary head device in which an earth brush for grounding the rotary drum is brought into contact with the rotor near the center of rotation, as well as a magnetic recording and reproducing apparatus using the same.

For achieving the above-mentioned objects, the rotary head device of the present invention has a structure in which a motor stator is supported by a fixed arm attached to a fixed drum or a CC base (cylindrical rotary drum and catcher base).

In the rotary head device of the invention, moreover, an earth brush is attached to the above fixed arm, and a contact portion of the earth brush and the rotary drum is positioned near the center of rotation where the sliding speed is low.

The CC base referred to above indicates a base for fixing and supporting both a cylindrical rotary drum and a catcher which positions a guide roller sideways of the drum.

More specifically, the rotary head device of the present invention, indicated by the reference numeral 1 in FIG. 1, includes a rotary drum 5 which carries thereon a head 6 for recording and reproducing a signal to and from a magnetic recording medium; rotating members such as a rotary shaft 3a and a disc 4 which are integrally connected with the rotary drum 5; a bearing unit 3 for supporting the rotation of the rotary drum 5; a fixed drum 2 for fixing and supporting the bearing unit 3; and a motor 9 for rotating the rotary drum 5, the motor 9 being incorporated in the rotary drum 5, in which rotary head device a stator 13 of the motor 9 is supported by a fixed arm 15 which is attached to the fixed drum 2 or to a fixed drum supporting member (22, 23, FIG. 3) such as a CC base. The stator 13 of the motor 9 may be supported by the fixed arm 15 through a stator holder 16 attached to the fixed arm 15. Further, an earth brush 18 attached to the fixed arm 15 or to the stator, holder 16 may come into contact with the rotary shaft 3a.

Other constructional points than the above in the rotary head device and the magnetic recording and reproducing apparatus using the same according to the present invention may be based on conventional knowledge in this technical field.

In the rotary head device of the present invention, since the stator of the motor is attached to the fixed arm, it is not necessary to fix the shaft, and hence it is possible to adopt a rotary shaft type rotary head device similar to a conventional one.

Further, the earth brush can be attached to the fixed arm mentioned above.

DESCRIPTION OF THE PREFERRED EMBODIMENTS

Embodiment 1

An embodiment of the present invention will be described below with reference to FIG. 1.

Figure 1:
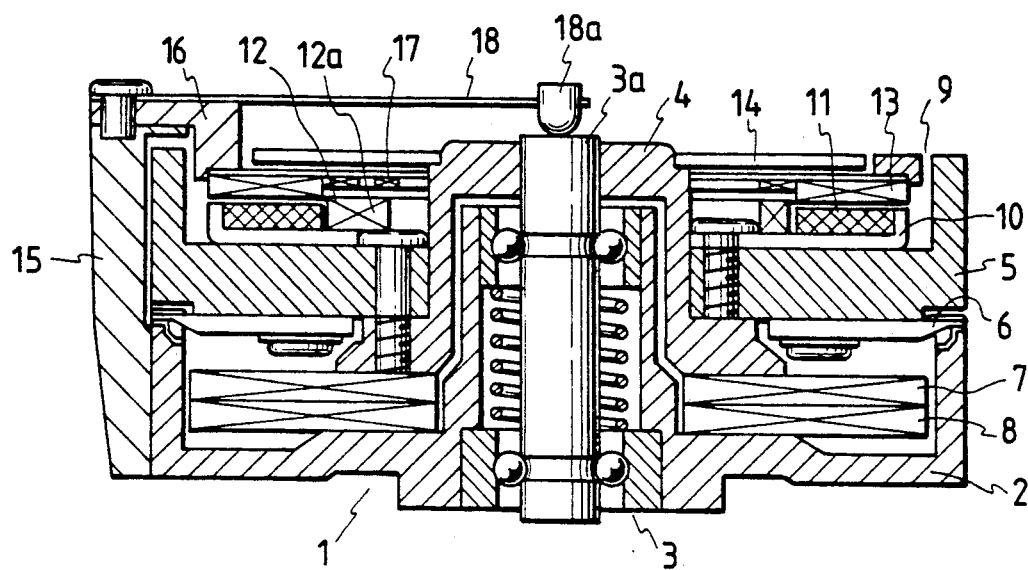
FIG. 1 is a longitudinal sectional view showing the structure of a rotary head device according to an embodiment of the present invention.

FIG. 1 is a sectional view showing the structure of a rotary head device 1 embodying the present invention. In the rotary head device 1, a bearing unit 3, comprising bearings and a shaft both in an assembled state, is mounted in the center of a fixed drum 2. On shaft 3a of the bearing unit 3 there is mounted a disc 4 by shrink fit, and a rotary drum 5 is screwed to the upper surface of the outer peripheral portion of the disc 4, while a plurality of magnetic heads 6 are screwed to the underside of the rotary drum 5. The magnetic heads 6 are mounted so that the front end of each magnetic head projects several tens of $\mu$m from the outer peripheral surface of the rotary drum 5 and comes into contact with the surface of a magnetic tape (not shown) from between the rotary drum 5 and the fixed drum 2. Further, a rotating side rotary transformer 7 is fixed by bonding to the underside of the disc 4, while a stationary side rotary transformer 8 is fixed to the fixed drum 2 in a spaced relation of several tens of $\mu$m from the rotating side rotary transformer 7. In the upper surface of the rotary drum 5 is incorporated a brushless motor 9. More specifically, a rotor yoke 10 is screwed to the rotary drum 5, and ring-like driving magnet 11 and FG magnet (frequency generator magnet) 12 are fixed concentrically to the upper surface of the rotor yoke 10. The driving magnet 11 and the FG magnet 12 are multipolarwise magnetized in the planar direction. On the inner peripheral side of the FG magnet 12 there is formed a convex portion 12a corresponding to a two-pole width. In positions opposed to the driving magnet 11 and the FG magnet 12 there are disposed a stator 13 comprising integrally-constituted driving coil and FG coil, as well as a back yoke 14. The back yoke 14, which is mounted to the disc 4, constitutes a magnetic path together with the driving magnet 11. The stator 13 is supported inside the said magnetic path by means of a fixed arm 15, which is screwed to the fixed drum 2, and a stator holder 16, which is screwed to the fixed arm 15, together with a ground brush 18. The stator 13 is fixed by bonding to the stator holder 16. The FG coil of the stator 13 has a diameter almost equal to that of the FG magnet 12 and is positioned in a face-to-face relation to the FG magnet. Further, a Hall element 17 as a magnetosensitive element is mounted to the inner peripheral portion of the FG coil to detect a magnetic flux of the convex portion 12a formed on the inner peripheral side of the FG magnet 12.

The convex portion 12a formed on the inner peripheral side of the FG magnet 12 serves as a signal generator for detecting a rotational position of the rotary head device and is generally called tack or pulse generator.

The fixed arm 15 extends outside the fixed drum 2 and upwards parallel with the rotary shaft so as not to contact the rotary drum 5. Although in this embodiment the upper surface of the fixed arm 15 is higher than that of the rotary drum 5, this is not always required if only a stator holder of an appropriate shape (for example, a shape having legs for mounting to the fixed arm) can be mounted to the fixed arm.

The ground brush 18 is mounted to the stator holder 16 by screwing or by caulking, and a contact 18a, provided at one end of the ground brush 18, is in contact with an end face of the shaft 3a. The ground brush 18, stator holder 16, fixed arm 15 and fixed drum 2 are each formed using a material superior in electrical conductivity. Also, the shaft 3a, disc 4 and rotary drum 5 are formed using a highly electroconductive material. Therefore, the fixed drum 2 and the rotary drum 5 are held in a state of low electrical resistance. The fixed drum 2 is screwed to a CC base or a chassis of a recording and reproducing apparatus (not shown). The CC base or the chassis is grounded to the ground level of a signal processing circuit, so that the rotary drum 5 is also grounded to the ground level, as noted previously. By this grounding of the rotary drum 5, it is possible to suppress the noise contained in a playback signal from each magnetic head 6.

In the rotary head device of this embodiment, as the constituent material of the fixed arm 15 and stator holder 16 there may be used a metallic material such as aluminum alloy, brass, or iron.

Figure 2:
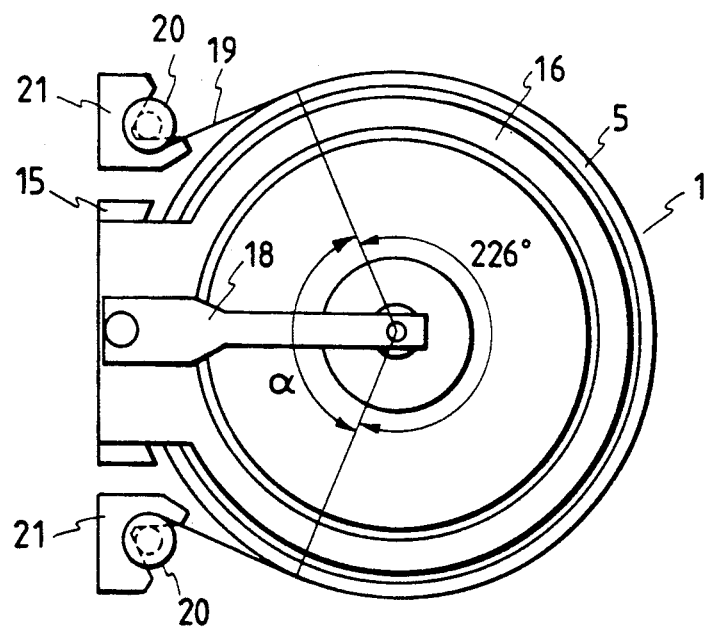
FIG. 2 is a top view showing part of a recording and reproducing apparatus using the rotary head device of FIG. 1.

FIG. 2 is a top view showing part of an 8 mm video type recording and reproducing apparatus using the rotary head device of this embodiment described above. In this type of a recording and reproducing apparatus, it is necessary that the winding angle of a magnetic tape 19 for the rotary head device 1 be not smaller than 221° in order to record and reproduce a video signal and an audio signal time-sharingwise on the same track. In FIG. 2, the winding angle is set at 226°, providing a margin. Thus, since the winding angle of the magnetic tape 19 is large, the spacing between guide rollers 20 and that between guide catchers 21 are narrow as shown in FIG. 2. But the mounting space for the fixed arm 15 can be ensured. By disposing the fixed arm 15 within a range smaller than the angle $\alpha$ in FIG. 2 in which range the magnetic tape 19 is not wound round the rotary head device 1 during recording or playback, it is possible to reduce the distance between the rotary drum 5 and the fixed arm 15. Consequently, it is possible to provide a compact rotary head device.

EMBODIMENT 2

Figure 3:
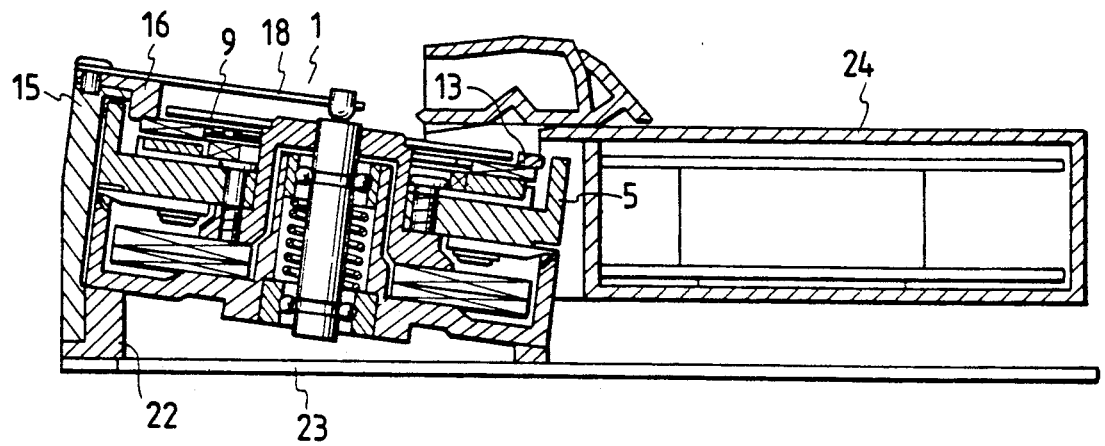
FIG. 3 is a longitudinal sectional view showing a recording and reproducing apparatus according to another embodiment of the present invention.

FIG. 3 is a sectional view of a recording and reproducing apparatus using a rotary head device according to this embodiment 2. In FIG. 3, the rotary head device, indicated at 1, is screwed to a CC base 22 which is mounted on a chassis 23. To the CC base 22 is screwed a fixed arm 15, which supports a stator 13 of a brushless motor 9, a stator holder 16 and an earth brush 18 in the same manner as in the embodiment 1. As illustrated in FIG. 3, the brushless motor 9 of the rotary head device 1 can be disposed inside a rotary drum 5, and an extremely small-sized recording and reproducing apparatus can be provided by disposing a cassette case 24 and the rotary head device 1 in a planarly overlapped fashion. In FIG. 3, moreover, the same construction can be provided even by forming the fixed arm 15 and the CC base 22 integrally with each other.

Although in FIG. 3 the CC base 22 and the chassis 23 are separate members, the chassis 23 may be formed by die casting of aluminum and rendered integral with the CC base 22. In this case, the fixed arm 15 is mounted to the chassis 23, but there can be obtained the same effect as in FIG. 3.

EMBODIMENT 3

Figure 4:
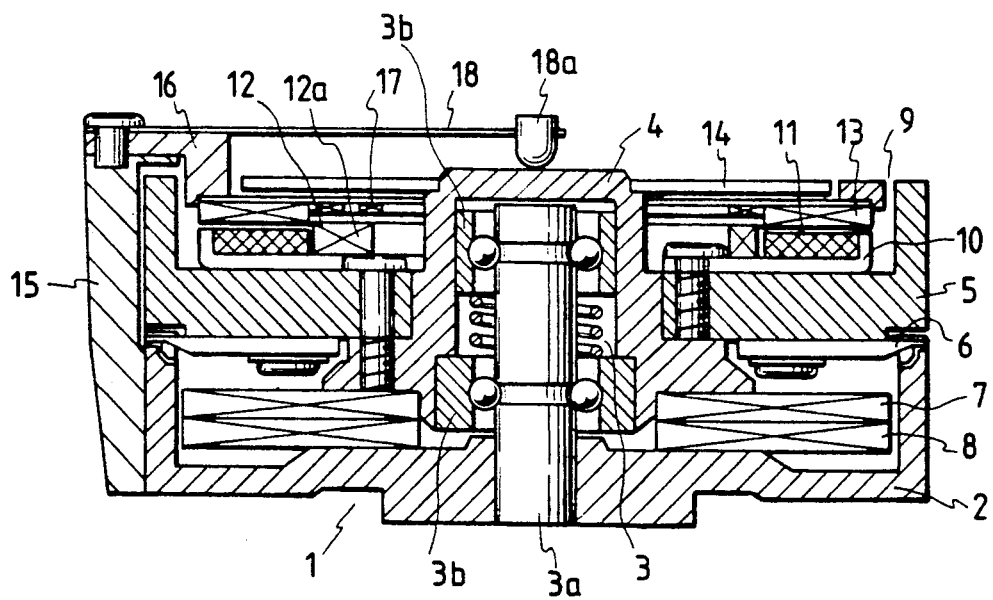
FIG. 4 is a longitudinal sectional view of a rotary head device according to a further embodiment of the present invention.

FIG. 4 is a sectional view of a rotary head device according to this embodiment 3, which is different in the bearing structure from the embodiment 1 illustrated in FIG. 1. More specifically, in a bearing unit 3, a shaft 3a is fixed and supported in the center of a fixed drum 2, and a cup-shaped disc 4 is fitted over outer races 3b of the bearing unit 3, so that the disc 4 is supported rotatably about the shaft 3a. A rotating side rotary transformer 7 and a rotary drum 5 are fixed to the disc 4, and a brushless motor 9 is disposed inside the rotary drum 5. A stator 13 of the brushless motor 9 is supported by a fixed arm 15, attached to the fixed drum 2, and a stator holder 16, attached to the fixed arm 15. A ground brush 18 is mounted to the stator holder 16 so that a contact 18a thereof comes into contact with the center of rotation of the disc 4 or thereabouts, and ground brush 18 serves to maintain the potential of the rotary drum 5 at the ground level.

Since the ground brush 18 can be brought into contact with the center of rotation of the disc 4 as mentioned above, there no longer arise such problems as abrasion of the ground brush 18 and increase of the rotational load.

Further, in a recording and reproducing apparatus using a conventional rotary head device, there is required a support member for the mounting of a ground brush, but according to the rotary head device of the present invention the fixed arm 15 can also serve as the conventional support member, so it is possible to provide a thin recording and reproducing apparatus without an increase in the number of components.

The reference numerals and symbols not referred to in any of the foregoing drawings indicate substantially the same portions as those of the same reference numerals and symbols in the other drawings.

Since the present invention is constructed as above, there are attained the following effects.

Since the stator of the motor is supported through a fixed arm, the motor can be incorporated in a rotary drum using the same rotary shaft type bearing structure as in the prior art. Consequently, the manufacturing technique and equipment for the conventional rotary shaft type rotary head device can be utilized effectively.

Further, since the position of contact of the ground brush and the rotor can be set near the center of rotation even in the case of using a fixed shaft type bearing structure, it is possible to prevent abrasion of the ground brush and increase of the rotative driving torque.

Additionally, by mounting the ground brush to the fixed arm or to a stator holder, it is made possible to prevent an increase in the number of components.

What is claimed is:

1. A rotary head device comprising:
   a fixed cylindrical drum;
   a bearing unit fixedly supported by said fixed cylindrical drum;
   rotary drum means rotatably supported by said bearing unit;
   a head mounted on said rotary drum means, to rotate therewith, for recording and reproducing a signal on a recording medium;
   a fixed arm fixedly connected to said fixed cylindrical drum and extending in the axial direction from a point on the periphery of said fixed cylindrical drum;
   stator holding means connected to the free end of said fixed arm and extending within said rotary drum means;
   a motor disposed within said rotary drum means for rotating said rotary drum means and said head about an axis of rotation, said motor including a stator supported by said stator holding means; and
   a ground brush connected to said fixed arm and in contact with said rotary drum means.

2. A rotary head device as claimed in claim 1, wherein said fixed arm comprises a fixed drum supporting member, supporting said fixed cylindrical drum, and an arm member attached to said fixed drum supporting member and extending in the axial direction of said fixed cylindrical drum.

3. A rotary head device as claimed in claim 2, wherein said arm member and said fixed drum supporting means are integrally formed.

4. A rotary head device as claimed in claim 1, wherein said fixed arm is connected to said fixed cylindrical drum at an angular position, with respect to the axis of rotation of said rotary drum means, which angular position is free of the recording medium during recording and reproducing of a signal on the recording medium.

5. A rotary head device as claimed in claim 1, wherein said ground brush is mounted to said stator holding means.

6. A rotary head device as claimed in claim 1, wherein said rotary drum means comprises a rotatable member rotatably mounted on said bearing unit, and a drum member connected to said rotatable member for rotation therewith.

7. A rotary head device as claimed in claim 6, wherein said ground brush is mounted to said stator holding means.

8. A rotary head device as claimed in claim 1, wherein said rotary drum means comprises a shaft member rotatably mounted on said bearing unit, a disc member connected to said shaft member for rotation therewith, and a drum member connected to said disc member for rotation with said disc member and said shaft member.

9. A rotary head device as claimed in claim 8, wherein said ground brush is mounted to said stator holding means.

* * * * *